Nov. 21, 1944. W. H. FISCHER 2,363,169
BREAD TOASTER
Filed Sept. 29, 1941 3 Sheets-Sheet 2
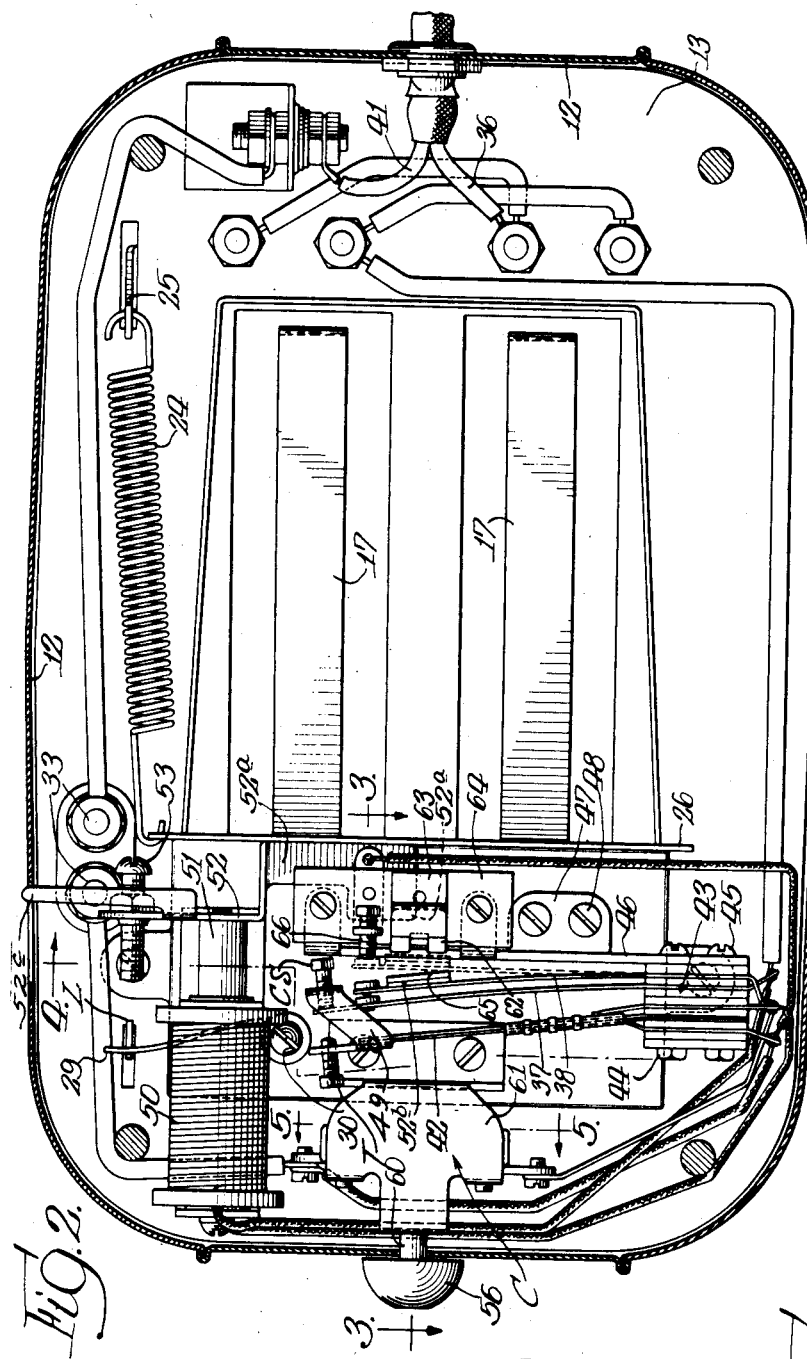
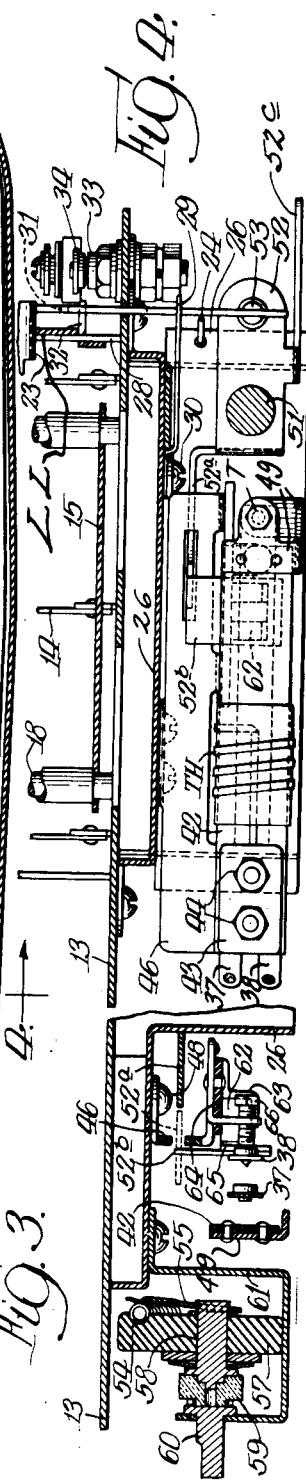
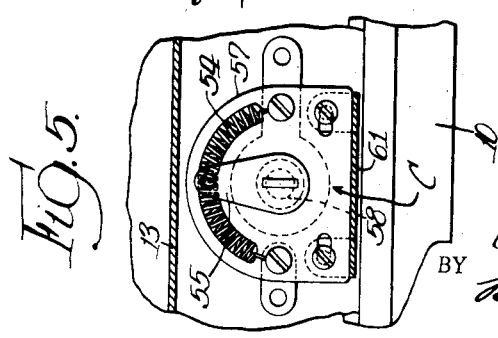
INVENTOR.
William H. Fischer,
BY Bair & Freeman
attys.

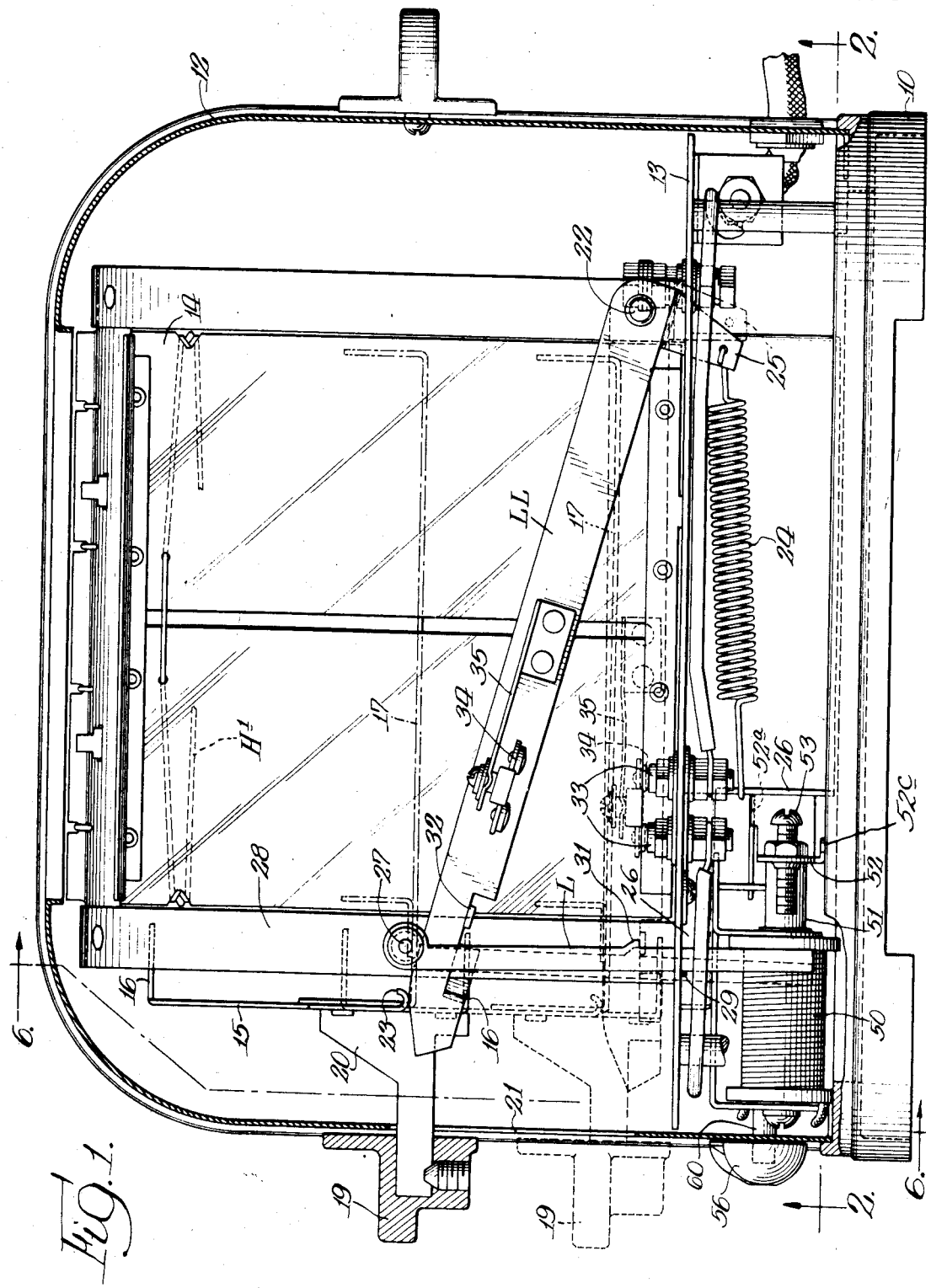

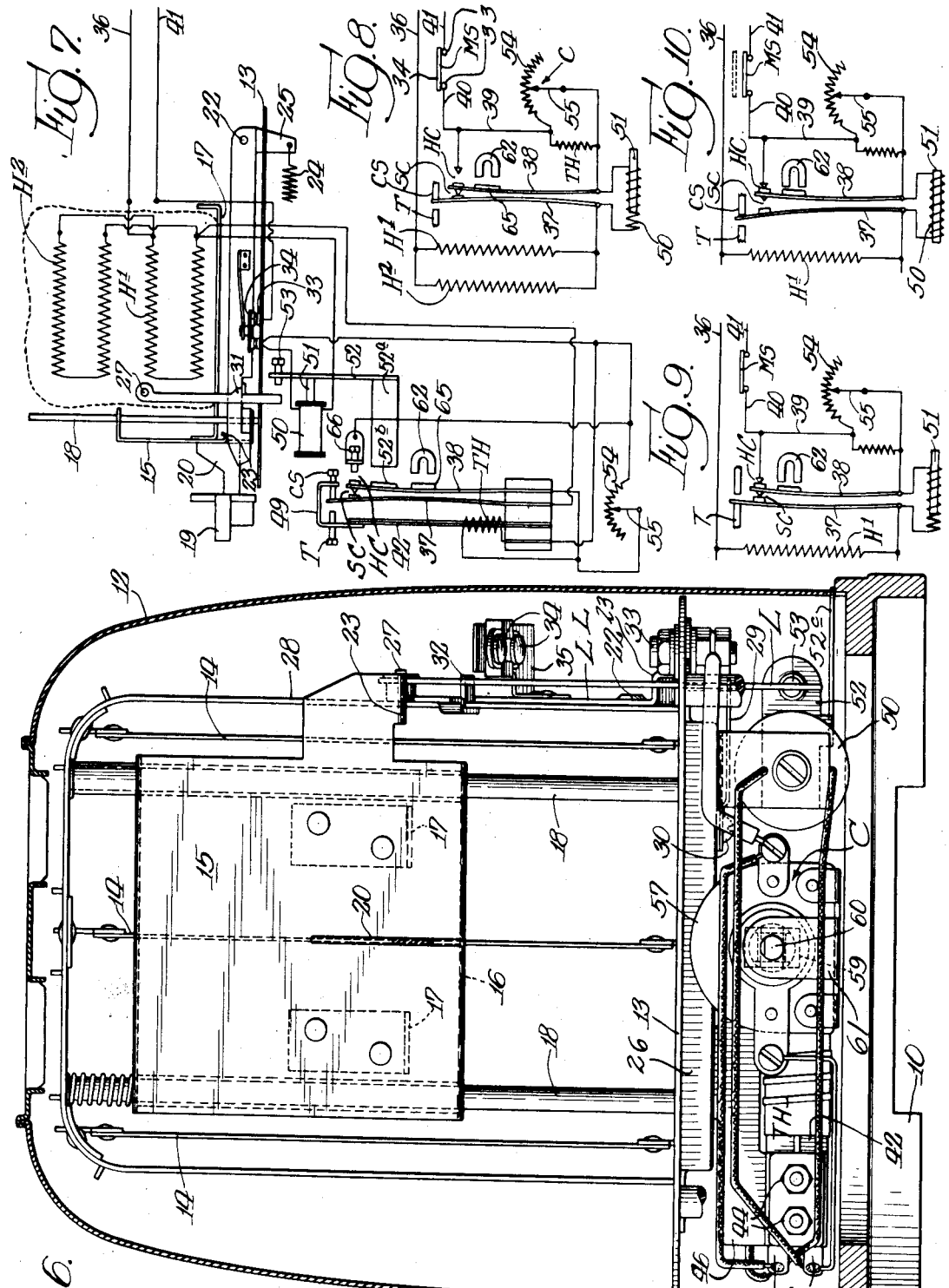

Patented Nov. 21, 1944

2,363,169

UNITED STATES PATENT OFFICE 2,363,169

BREAD TOASTER

William H. Fischer, Des Plaines, Ill., assignor to National Stamping & Electric Works, Chicago, Ill., a corporation of Illinois Application September 29, 1941, Serial No. 412,824

8 Claims. (Cl. 99—329)

My present invention relates to a bread toaster of the automatic type wherein the toasting period for the bread is thermally timed and thermostatically regulated in accordance with the temperature of the toaster.

One object of the invention is to provide a toaster of this general type which is simple and inexpensive to fabricate.

Another object is to provide a toaster wherein a bread carrier may be manipulated manually for lowering the bread to toasting position and at the same time setting the timing mechanism for a period of time which will produce bread toasted to the desired degree, the timing mechanism being adjustable so as to change the period as desired.

Another object is to provide the bread carrier mounted so that it is freely slidable vertically and may be accordingly manipulated for elevating the bread from toasting to an inspecting position any time desired without interfering with the timing mechanism.

Still another object is to provide an arrangement of elements constituting the bread toaster whereby the bread carrier, when lowered to toasting position, will close an electric switch for the heating elements of the toaster and will latch a spring-urged lifting lever in lowered position, from which position it may be released by a latch operated by timing mechanism at the expiration of the timing period, the lifting lever under its spring bias thereupon automatically elevating the bread carrier from the toasting to inspecting and removing position and at the same time opening the heating element circuit at a main switch.

A further object is to provide a timer of the thermally actuated type which has a heater energized by closure of the main switch to initiate a timing period, which period varies, depending upon the timer setting, and at the end of such period the heater is operatively deenergized and the timer cools down, the heating element for toasting the bread, however, remaining in operation until a further time period has expired, depending upon a color sequence adjustment, whereupon the main switch is opened for deenergizing the heating element and thereby terminating the bread toasting operation.

Still a further object is to provide, in addition to the timer and color sequence adjustments, which adjustments are made at the factory, an adjustment for the color of the toast, consisting of a rheostat shunting the heater for the timer mechanism whereby the heating effect of said heater may be changed, as desired.

Still a further object is to provide a timer having a permanent magnet adaptable to hold an armature of the timer to one position when it has assumed such position and to retain it in such position during a cooling down period of the timer mechanism sufficient to cause a tripping action to stop the toasting operation, the tripping action effecting mechanical movement of the armature away from the magnet and the entire arrangement securing substantially uniform timing operations.

Still a further object is to provide a timer operable to control a solenoid which trips the toaster and moves the armature away from the magnet, permitting the toaster to stop operating and the timer to revert to a position permitting the starting of another toasting operation, the solenoid being controlled by a shunt switch operated by the timer, and another shunt switch being provided, also operated by the timer and effective to control the heater for the timer.

With these and other objects in view, my invention consists in the construction, arrangement and combination of the various parts of my device whereby the objects contemplated are attained, as hereinafter more fully set forth, pointed out in the claims and illustrated in the accompanying drawings in which:

Figure 1 is a vertical view partially in cross-section, of a bread toaster embodying my present invention.

Figure 2 is a sectional view on the line 2—2 of Figure 1, showing a bottom plan view of the timing mechanism.

Figure 3 is a sectional view on the line 3—3 of Figure 2.

Figure 4 is a sectional view on the line 4—4 of Figure 2.

Figure 5 is a sectional view on the line 5—5 of Figure 2.

Figure 6 is a vertical sectional view on the line 6—6 of Figure 1.

Figure 7 is a diagrammatic view showing my toaster and circuit connections therefor; and Figures 8, 9 and 10 are electro-diagrammatic views showing different positions of the circuit controlling members in the various circuits of the toaster.

On the accompanying drawings I have used the reference numeral 10 to indicate generally a base. A casing 12 is mounted on the base 10 and encloses a supporting plate 13. The plate 13 has supported thereon sheets of insulation 14 on which are wound heating elements $H^1$ and $H^2$ of "Nichrome" ribbon or the like. The heating elements H¹ and H² are the main heating elements for toasting bread in the casing 12, the present toaster being illustrated as one of the two-slice oven type.

A bread carrier is provided in the form of an end plate 15 having inturned perforated flanges 16 and a pair of bread supporting straps 17. The plate 15 is movable vertically by reason of its perforated flanges 6 being slidable on a pair of guide rods 18. The plate may be manually manipulated by a knob 19. The knob 19 is secured to a bracket 20 extending from the plate 15. The bracket 20 extends through a vertical slot 21 in the casing 12.

For automatically raising the bread carrier I provide a lifting lever LL pivoted at 22 on the supporting plate 13 and engageable at its upper end with a lateral extension 23 of the plate 15. A spring 24 is connected at one end with a downward extension 25 of the lifting lever LL adjacent the pivot 22 and at its other end to a stationary point, such as a supporting bracket 26 extending downwardly from the supporting plate 13 and constituting a mounting bracket for the entire timer.

From the foregoing description it is obvious that the bread carrier straps 17 may be lowered for positioning slices of bread in toasting position between the heating elements H¹ and H², and when the knob 19 is released the spring 24 will raise the bread carrier. To latch the lever LL so that the bread carrier will remain in lowered or toasting position, I provide a latch L, pivoted at 27 to a frame member 28 secured to and extending upwardly from the supporting plate 13. The latch L is biased to latching position by a latch spring 29 secured at 30 to the bottom of the supporting plate 26. The latch lug of the latch L is shown at 31, and this lug is engageable with a cooperating lug 32 on the lifting lever LL.

A main switch is provided for the heating elements H¹ and H² in the form of a pair of stationary contacts 33 and a bridging contact 34. The bridging contact 34 is carried by a leaf spring 35 which, in turn, is carried by the lifting lever LL. When the bread carrier is lowered the extension 23 engages the lifting lever LL to swing it downwardly to operate the latch L and to close the switch contacts 33—34, as shown by dotted lines in Figure 1 and in Figure 4.

As shown in Figure 7, the main switch 33—34 is connected in circuit with the heating elements H¹ and H², the elements themselves being connected in shunt and the element H² being omitted from Figures 9 and 10. In the normal or cold position of Figures 7 and 8 there are also a pair of contacts which I will call solenoid contacts SC in the circuit and a timer heater TH. This is shown most clearly in Figure 8, where the circuit can be traced from line wire 36 through heating elements H¹ and H², switch blade 37 to the solenoid contacts SC, switch blade 38, timing heater TH and wires 39 and 40 to the switch 33—34 connected to the other line wire 41. The timer further includes a temperature responsive element, such as a bimetal strip 42, anchored at one end, as on a stack of insulating plates 43, which, in turn, are supported by screws 44 and 45 on a bracket 46. The bracket 46 has a foot 47 secured as by screws 48 to the supporting plate 26. The bimetal element 42 carries a bracket 49 which, in turn, carries a timer adjusting screw T and a color sequence adjusting screw CS. The screws T and CS are adapted to engage an extended end of the switch blade 37 for operating the contacts SC and HC, as will hereinafter appear.

My timing mechanism further includes a solenoid 50 having a movable core 51 to which is secured a bracket 52 carrying an adjusting screw 53. The adjusting screw 53 is adapted to engage the latch L for releasing it at the end of the toaster timing period, as determined by energization of the solenoid 50. The bracket 52 also has an extension 52ᵃ adapted to engage the switch blade 38 for a purpose which will hereinafter appear.

For adjusting the color of the toast I provide a color adjusting device, indicated generally at C, and comprising a rheostat coil 54, a rheostat blade 55 and a knob 56 for operating the rheostat blade. As shown in Figures 3 and 4, the coil 54 is supported on an insulating member 57 through which a shaft 58 rotatably extends. The shaft has the blade 55 secured thereto, and is connected by an insulating coupling member 59 with a shaft 60. The shaft 60 has the knob 56 thereon, and the shaft is rotatably supported in a bracket 61. The bracket 61 also supports the insulation member 57. The rheostat 54—55 shunts the timer heater TH so that the current to the heater is split, part of it going through the portion of the coil 54 in circuit, as determined by the position of the rheostat blade 55. By changing the position of the blade, more or less current goes through the timing heater TH, so that shorter or longer timing periods respectively are had. To secure snap action of the contacts HC and delay subsequent opening of these contacts until a predetermined period in the operating cycle, I provide a permanent magnet 62 mounted as by a clamp bracket 63 on a bracket 64. The switch blade 38 carries an armature 65 for cooperation therewith. The heater contacts HC include a differential adjusting screw 66 for determining the adjacency of the armature 65 to the poles of the magnet 62 when the parts assume the position of Figure 9 or Figure 10.

*Practical operation*

In the operation of my bread toaster, when it is desired to toast bread from a cold start, the slices of bread are deposited on the supporting strap 17 and the knob 19 then depressed. Depression of the knob lowers the supporting straps 17 and swings the lifting lever LL downwardly against the bias of the spring 24. The lever finally assumes latched position, as shown by dotted lines in Figure 1, in which position the bridging contact 34 bridges the contacts 33 for establishing the toasting circuit. Figure 7 illustrates the energized position of the heating elements and also the normal position of other elements of the timer. Figure 8, likewise, illustrates the parts in starting position.

Since current is now flowing through the timer heater, it will heat up and warp the bimetal element 42 toward the right in Figure 7, thus permitting the switch blades 37 and 38 to move toward the right, the solenoid contacts SC, however, remaining engaged with each other due to the switch blades 37 and 38 being under tension. At the end of a predetermined period determined by the timer adjusting screw T engaging and then bending the blade 37 toward the right, the heater contacts HC will close, as in Figure 9. During such bending movement the bimetal element 42 is tensioned until the armature 65 is close enough to the magnet 62 to permit the magnet to attract the armature and finish the closing movement of the heater contacts HC, with snap action, the contacts SC remaining closed by the built up tension in the blade 37, causing it to effect follow-up of the blade 38. The magnet will thereafter keep the contacts HC in tightly closed position, with the contacts SC remaining closed also.

Closure of the contacts HC shunts the timer heater TH as the current will then flow from the contacts SC directly across the contacts HC, and the heating elements H¹ and H² only will be in the circuit. As the timer heater TH is now shunted out of the circuit it will start cooling down, and the bimetal element 42 will warp toward the left. After a cooling period, which is determined by the setting of the color sequence adjusting screw CS, this screw will engage the switch blade 37 to separate its contact from the contact on the switch blade 38 (contacts CS) as shown in Figure 10, with the magnet 62 still holding the armature 65 and thereby the heater contacts HC engaged. Opening of the solenoid contacts SC will break the circuit at this point so that the current will then travel through the solenoid 50, as traceable in Figure 10. Energization of the solenoid, of course, will trip the latch L, thereby opening the main switch 33—34 and cutting off the current to all elements of the toaster. Operation of the solenoid 50 also causes the extension 52ᵃ of the bracket 52 to engage the switch blade 38 and move it from the position of Figure 10 to the initial position of Figures 7 or 8. The timing mechanism is accordingly now in condition for another toasting operation.

Due to my timer mechanism being of the thermostatic type, the general heating up of the toaster will flex the bimetal element 42 farther toward the right than when the toaster is cold, thus shortening the timing periods and thereby compensating for a rise in the general toaster temperature. The timing period may be manually controlled by adjusting the rheostat 54—55 to thereby vary the heating effect of the timer heater TH on the bimetal element 42. As a factory adjustment the timer adjusting screw T is set to secure a medium timing period when the rheostat 54—55 is set at its central position. The factory adjustment further includes the color sequence adjusting screw CS which is adjusted to secure substantially the same color of successive slices, regardless of whether they are toasted when the toaster is cold or when it is heated up. The timer switching mechanism including the contacts SC and HC, is so designed that the magnet 62 effects snap action and also retention of the heater contacts HC closed while the bimetal element 42 is opening the solenoid contacts SC. Thereafter, the solenoid 50, upon operation, effects release of the armature 65 from adjacent the magnet 62 in a mechanical manner, thus setting all parts of the timer mechanism for a subsequent toasting operation.

The timer heater TH compensates the timer mechanism for voltage variation by reason of the timer mechanism heating up more quickly when the voltage is high and the bread thereby toasted to the same color more quickly. In the event that the operator desires to terminate the toasting operation before the timer mechanism does so, a second extension 52ᶜ on the bracket 52 extends to a point outside the toaster casing where it can be manually engaged and pushed toward the left in Figure 2 to engage the screw 53 with the latch L and thereby release the lever LL to open the main switch 33—34 and raise the bread carriers 17.

I claim as my invention:

1. In a bread toaster, an electric heating element, a bread carrier movable to and from toasting position with relation to said heating element, means for locking said bread carrier in position for toasting a slice of bread thereon and for simultaneously closing the circuit for said heating element, a thermally responsive member, an electric heater for applying heat thereto, said heater being energized by closure of said heating element circuit, means deenergizing said electric heater when it has been heated to a predetermined temperature whereby the thermally responsive member is permitted to cool while the heating element remains energized, said last means comprising switch contacts, an armature and a magnet, said switch contacts being operated toward heater deenergizing position by said thermally responsive member and operated finally to such position by said armature and magnet, means for terminating the toasting operation and moving said bread carrier from toasting position by releasing said locking means when said thermally responsive member has cooled to a predetermined temperature, said last means comprising an electromagnet having a circuit controlled by said thermally responsive member, said electromagnet being operable to move said locking means to inoperable position and to move said armature away from said magnet to release said switch contacts from heater deenergizing position.

2. In a device of the class described, a bread toaster provided with electrical bread heating elements and timing means for indicating the completion of successive operating intervals of the toaster comprising a temperature responsive device having a portion thereof free to move in response to temperature changes, an electrical heater energizable with the toaster heating elements at the initiation of a toasting interval for heating said temperature responsive device and causing the movable portion thereof to move in a first direction, a switch for eventually deenergizing said electrical heater to allow cooling of the temperature responsive device and resultant movement in a reverse direction without deenergizing the bread heating elements, electromagnetic means responsive to cooling movement of the temperature responsive device to indicate the completion of a toasting interval, and a magnet and an armature associated with said switch to retain it in electrical heater deenergizing position, said electromagnetic means upon operation, opening said switch against the retention constraint of said magnet and armature.

3. In a toasting device of the type adapted to be used in carrying out a plurality of successive toasting operations, a timer for establishing intervals of operation comprising a thermally responsive member, a heater for heating said thermally responsive member thereby to cause movement thereof, means for initiating operation of said heater upon initiation of a toasting operation, means responsive to movement of said thermally responsive member for rendering said heater inoperative, said means having an armature, a magnet attracting said armature to hold said last member in heater inoperative position, thereby to permit the thermally responsive member to cool, electromagnetic means for terminating a toasting cycle, a shunt switch to shunt said electromagnetic means out of circuit, said shunt switch being responsive to cooling movement of said thermally responsive member after said heater is rendered inoperative whereupon said shunt switch opens to effect energization of said electromagnetic means and causes it to thereby interrupt the toasting operation of said device, said electromagnetic means thereupon moving said armature away from said magnet whereby the magnet is then inoperative to hold said thermally responsive member in heater inoperative position.

4. In a toaster device, a heating element, a carrier for bread or the like to be toasted, a timer comprising a bimetallic strip for determining periods of toasting operation by a heating and cooling action thereof, an electric heater for said strip, a circuit for said heater, heater contacts controlled by said strip whereby movement of the strip responsive to heating thereof actuates said heater contacts and they stop current flow through said heater, the operation of said heating element continuing during return movement of said strip by the cooling thereof after the flow of current in said heater has ceased, armature and magnet holding means rendered effective by said bimetallic strip and remaining effective during return movement of said strip to keep said heater contacts in their position to stop current flow through said heater, and means energized after a predetermined extent of the cooling movement of said strip to release said armature and magnet holding means, such extent determining the color sequence of the toasting operations.

5. In combination with apparatus adapted to perform a toasting operation, timing mechanism for automatically stopping such toasting operation after a predetermined interval, said mechanism comprising a solenoid and a resilient bimetal strip, means supporting said strip at one end, heating means for producing forward and return movement of the free end of said strip by heating and cooling thereof, means for timing the heating of said strip with relation to the starting of said timing operation, said means comprising contacts shunting said solenoid and closed at the beginning of the heating period, other contacts closed by said strip at the end of the heating period, a magnet and an armature to retain said other contacts in closed position after they are closed by said strip, means for stopping the return movement of said free end of said strip to store tension in the strip, means for utilizing the power of the tensioned strip to separate said first contacts, thereby energizing said solenoid and stopping said toasting operation and also overcoming the effect of said magnet on said armature to thereby open said other contacts, and a main switch operated by said solenoid for cutting off all current flow when said main switch opens.

6. The combination with cooking means comprising a main heating element and an associated carrier for a slice of bread or the like to be toasted, of a timer for establishing intervals of toasting time of said heating element, said timer comprising a thermally responsive member, heating means operative thereon until the latter has reached a predetermined high temperature and then rendered inoperative to further heat the member, thereby permitting said member to cool while said main heating element is still in action, means for interrupting the action of said main heating element when said timer member has cooled to a predetermined extent, said last means comprising a solenoid for effecting such interruption of the action of said main heating element, solenoid contacts shunting said solenoid and biased to closed position, a magnet, an armature attracted thereby and effective to retain one of said contacts in a predetermined position after it has been moved by said timer member to adjacent such position, said timer member upon heating and cooling thereof until the cooling action has progressed to a predetermined point separating the other of said solenoid contacts from said one of said contacts while it is held by said magnet in said predetermined position and means actuated by said solenoid when energized to return said one of said contacts to its initial position for recycling.

7. The combination with toasting means including a heating element and an associated carrier for bread or the like to be toasted, of a thermostatic timer for establishing toasting intervals of time comprising a thermally responsive member, means for heating said thermally responsive member simultaneously with said heating element, means operative as a result of the heating of said thermally responsive member for rendering said heating means inoperative with respect to said thermally responsive member, electromagnetic means for rendering said heating element inoperative, a circuit for said electromagnetic means, a shunt switch shunting said electromagnetic means, a permanent magnet associated with said shunt switch, said shunt switch being retained closed by said thermally responsive member as it heats up and by said permanent magnet as the thermally responsive member cools down until cooling has progressed to a predetermined degree whereupon said shunt switch is opened by said thermally responsive member to thereby permit a circuit through said electromagnetic means, said electromagnetic means upon energization reclosing said shunt switch and indicating termination of the toasting interval by an observable operation of said toasting means.

8. A toaster comprising in combination an electric heating element, a thermally actuable member, a heater for said member, a heating circuit for said heater, a shunt switch normally open in said circuit, a switch for said heating element spring-biased to open position, manually actuable means to effect closing of said switch, a latch to hold said switch closed, a second circuit comprising an electromagnetically actuated latch releasing means, means mechanically actuated by said thermally actuable member in its movement in a certain direction to effect closing of the shunt switch for said first circuit and thereby a return movement of said thermally actuable member, a magnet for holding said shunt switch closed during such return movement of said thermally actuable member, and means engaged by said thermally actuable member during its return movement to effect energization of said second circuit to release said latch, said latch releasing means thereupon opening said shunt switch in opposition to the bias of said magnet.

WILLIAM H. FISCHER.